(12) United States Patent
Legallais et al.

(10) Patent No.: US 7,596,138 B2
(45) Date of Patent: Sep. 29, 2009

(54) METHOD OF SENDING A MULTIPOINT STREAM IN A LOCAL AREA NETWORK AND CONNECTION DEVICE IMPLEMENTING THE METHOD

(75) Inventors: Yvon Legallais, Rennes (FR); Sébastien Perrot, Issy les Moulineaux (FR); Philippes Bordes, Laille (FR)

(73) Assignee: Thomson Licensing, Boulogne-Billancourt (FR)

( * ) Notice: Subject to any disclaimer, the term of this patent is extended or adjusted under 35 U.S.C. 154(b) by 607 days.

(21) Appl. No.: 11/322,926

(22) Filed: Dec. 30, 2005

(65) Prior Publication Data

US 2006/0165107 A1    Jul. 27, 2006

(30) Foreign Application Priority Data

Jan. 6, 2005    (FR) ................. 05 50051

(51) Int. Cl.
*H04L 12/66* (2006.01)
*H04W 4/00* (2009.01)

(52) U.S. Cl. .............. 370/390; 370/395.42; 370/338; 370/352

(58) Field of Classification Search .............. 370/389, 370/390, 352, 400, 395.1, 395.4, 395.2, 338, 370/329, 311; 709/203, 209, 238, 223, 245
See application file for complete search history.

(56) References Cited

U.S. PATENT DOCUMENTS

| 5,561,670 | A | * | 10/1996 | Hoffert et al. ............... 370/410 |
| 7,042,865 | B1 | * | 5/2006 | Meier et al. .................. 370/338 |
| 7,301,914 | B2 | * | 11/2007 | Segal et al. .................. 370/311 |
| 2002/0143951 | A1 | | 10/2002 | Khan et al. |
| 2003/0172114 | A1 | | 9/2003 | Leung |

FOREIGN PATENT DOCUMENTS

| EP | 0902569 | 3/1999 |
| WO | WO 00/51370 | 8/2000 |

OTHER PUBLICATIONS

Search Report dated Jun. 29, 2005.

* cited by examiner

*Primary Examiner*—Hanh Nguyen
(74) *Attorney, Agent, or Firm*—Robert D. Shedd; Joseph J. Opalach; Jerome G. Schaefer

(57) ABSTRACT

Within the framework of a wireless local area network, the sending of the multipoint transmission streams is not made reliable by an acknowledgment of receipt mechanism. This reliability may be improved by the sending in point-to-point mode of the packets belonging to a multipoint transmission stream. In the case of a digital service consisting of several streams of different priorities, it is possible to send only some of these streams in point-to-point mode while the other streams remain in multipoint. A gateway between the local area network and the exterior may be tasked with this selective transformation of the mode of transmission of the streams received.

13 Claims, 9 Drawing Sheets

METHOD OF SENDING A MULTIPOINT STREAM IN A LOCAL AREA NETWORK AND CONNECTION DEVICE IMPLEMENTING THE METHOD

FIELD OF INVENTION

The present invention relates to the sending of a multipoint stream over a network and more particularly to the manner of making the distribution of this stream over a local area network reliable, were the mechanism of multipoint distribution of this stream to turn out to be unsafe over the local area network and should it be possible to separate the transmitted stream into part of different priority.

TECHNICAL BACKGROUND

In packet-based information transfer networks, such as the Internet for example, IP local area networks or the like, several modes of transfer of the information are found. These modes may be classed into three categories as a function of the number of senders and of receivers engaged in this transmission. Firstly, there is point-to-point transmission (also known as "unicast") which allows a sender to dispatch an information packet to a single receiver identified by its address on the network. This is the mode of sending used by the most popular protocols of the Internet network such as the HTTP web page transfer protocol ("Hyper Text Transfer Protocol") or the FTP file transfer protocol. Another mode of sending consists in a sender transmitting a packet in broadcast mode. In this mode, the packet sent by the sender is sent to all the nodes of the network. This mode is not generally available on the Internet but is found on local area networks. The third mode consists in a sender or group of senders transmitting a packet to a group of receivers, in a multipoint mode of sending (otherwise known as "multicast"). In this mode the packets are sent to an address termed the multipoint transmission address and will be forwarded to all the destinations belonging to the transmission group. A client who joins a transmission group will be said to subscribe to the group and a client who leaves the group will be said to desubscribe from the group.

The multipoint transmission mode is used in practice to save intermediate bandwidth in the network when a source sends data to a group of destinations. Specifically, in this case, the use of a point-to-point mode of sending implies that the data are dispatched as many times as there are destinations. This mode brings about the duplication of the packets on the parts of the network that are common to the paths between the source and the various destinations. Conversely, multipoint transmission makes it possible to dispatch the data just once, this data being duplicated on the routers of the network, as a function of the paths leading to the destinations belonging to the transmission group. FIG. 1a illustrates the transmission of a data packet "P" sent by a node "S", the information source, to nodes "A", "B" and "C". It is seen that packet "P" is duplicated three times between the node "S" and the router "R1", twice between the routers "R1" and "R2" in the case of point-to-point transfer and is not duplicated in the case of multipoint transfer illustrated by FIG. 1b. In this case, a single packet "P" is sent by the source "S", the router "R1" knows that a packet must be resent on two branches out of three bound for node "A" and for the router "R2" which itself sends it to the clients "B" and "C" who are members of the group, since the clients A and B, C have previously informed the routers R1 and R2 that they wish to receive the packets of the group P. The packet is not dispatched towards the nodes "D" and "E" which are not members of the transmission group.

A local area network generally comprises a gateway linking the local area network proper and the exterior network, generally the Internet. To this gateway are connected, according to several possible technologies such as Ethernet, IEEE 1394 or technologies for wireless connection by radio, various local devices. These devices can access the exterior network via the gateway operating as a router between the local area network and the exterior network. When a local device, the client, wishes to join a multipoint data transmission group, he subscribes to the multipoint transmission address, for example according to the IGMP Internet Group Management Protocol which protocol is known by the reference "RFC 3376" at the IETF ("Internet Engineering Task Force"). Following this subscription, the node is recognized as a member of the transmission group and the packets corresponding to this stream, and transmitted in multipoint mode are routed from the Internet, via the gateway, to this client.

The streams transmitted in multipoint mode may often be divided into several parts. This is, for example the case when using incremental coders (also known as "scalable codecs"). These coders, a detailed description of which may be found (for example in ISO/IEC 14496-2:1999/FDAM 4, Coding of audio-visual objects—Part 2: Visual, Streaming video profile, Fine granularity scalability or else ISO/IEC JTC1/SC29/WG11, MPEG04/N6372 "Scalable Video Model V 1.0") are envisaged inter alia by the standard MPEG 4, ref. They have the particular feature of coding a digital service as several streams, a base stream and complementary streams. The base stream on its own makes it possible to reconstruct the service on the client in a degraded manner. For example it will be possible to reconstruct a low-resolution video of the service. While the decoding, of the base stream and of the complementary streams will allow the restitution of the service in its full quality. Non-incremental coders can also generate streams divisible into a base stream and complementary streams. It is for example possible to group the images as a function of their MPEG type (I, P or B) and to undertake temporal dimensioning.

It is found that on the local area network, according to the technology used, the multipoint transmission is not always performed safely. For example. were the local area network to be a wireless network operating according to a protocol of the 802.11 family in version a, b or g, the packet sent is tested to see whether it is intact and those packets that are not intact are discarded but not re-sent. They are lost.

SUMMARY OF THE INVENTION

The invention makes it possible to improve the reliability of the transmission of multipoint packets between the gateway and the final client, the destination of these packets on the local area network. This reliability is ensured by the transformation on the fly of these multipoint transmission packets into point-to-point transmission packets before sending them to their destination. Indeed, on these same networks, the sending of the packets according to the point-to-point method is secure and a mechanism provides for the resending of the packets that are not intact between the gateway and the client. To do this, the gateway intercepts a client's requests for subscription to a multipoint transmission address so as to maintain an association between the said addresses and the subscriber clients. Subsequently, the gateway intercepts the packets transmitted in multipoint mode to these addresses and sends them in point-to-point mode to subscriber clients. It is then possible to modify the compromise between robustness and bandwidth used by sending for example only the packets constituting the base stream in point-to-point mode while the packets constituting the complementary streams will be sent in multipoint mode. In this way, robust sending of at least the degraded version of the service is ensured and service interruptions are guarded against.

The problems set forth above are solved by a method of sending packets transmitted in multipoint mode

LIST OF FIGURES

The invention will be better understood, and other features and advantages will become apparent from reading the description which follows, the description making reference to the appended drawings among which:

Figure 3:
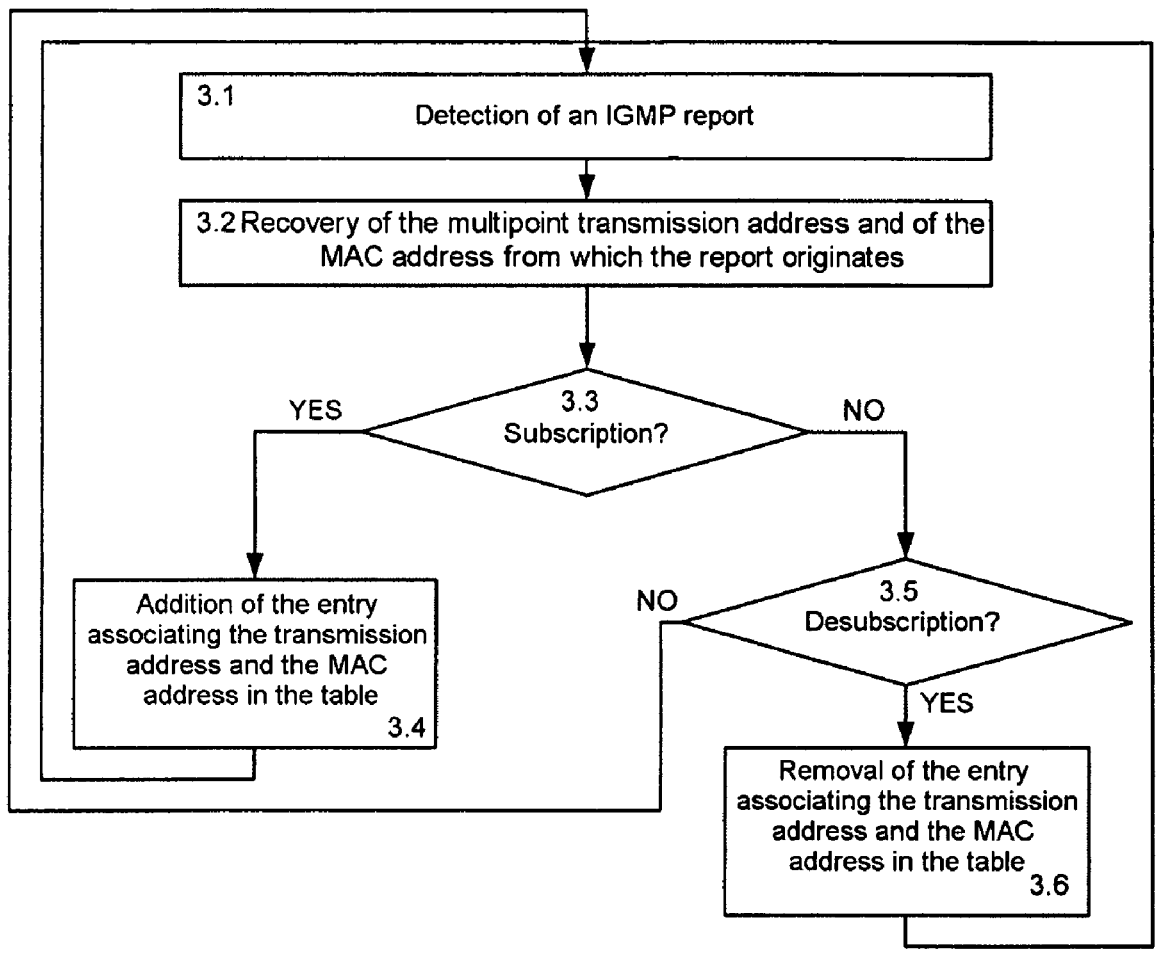

FIG. 3 details the steps of the processing by the gateway of an IGMP report of a client to a multipoint transmission according to the exemplary embodiment of the invention.

Figure 4:
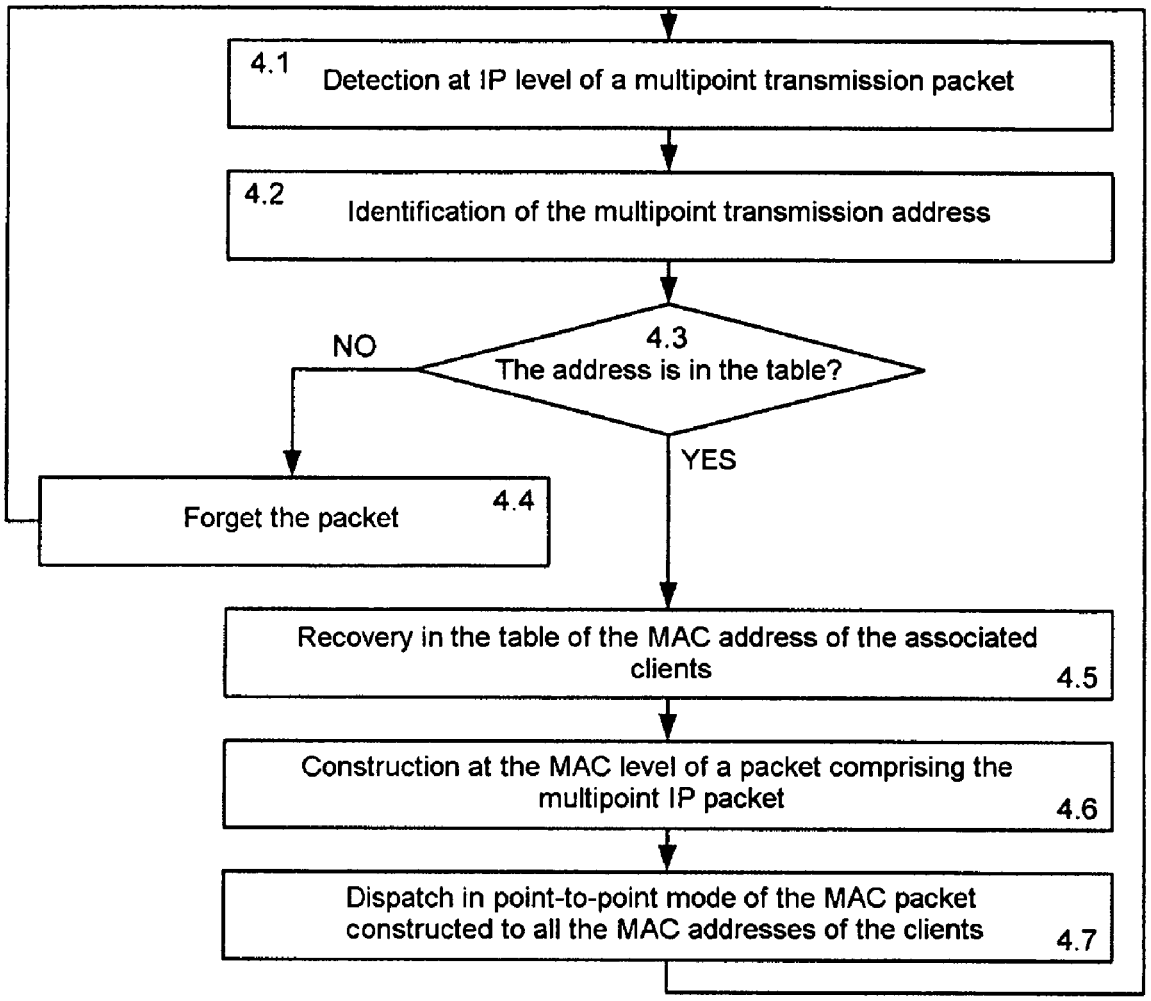

FIG. 4 details the steps of the processing of a packet transmitted in multipoint mode by this gateway.

Figure 5:
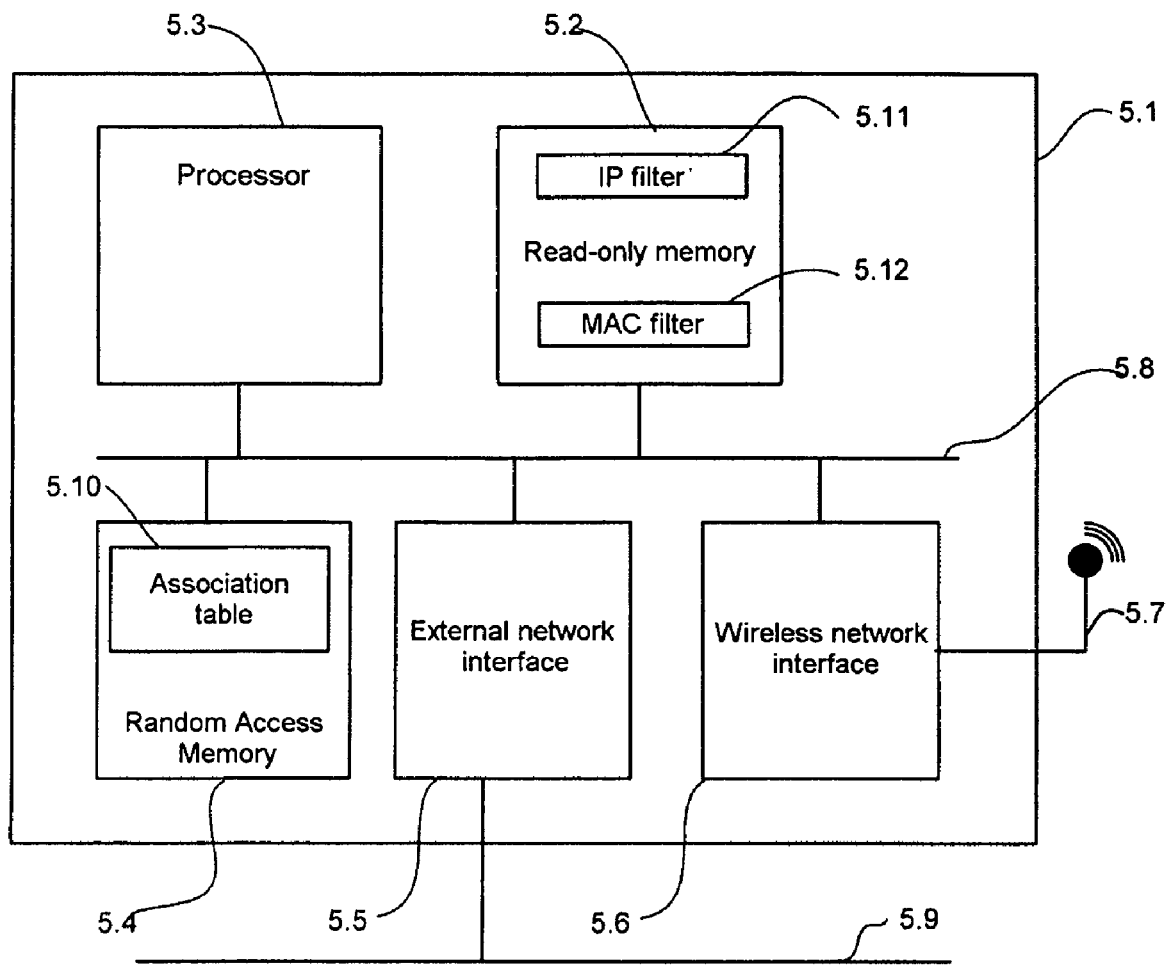

FIG. 5 details the architecture of a gateway operating according to the exemplary embodiment of the invention.

Figure 6:
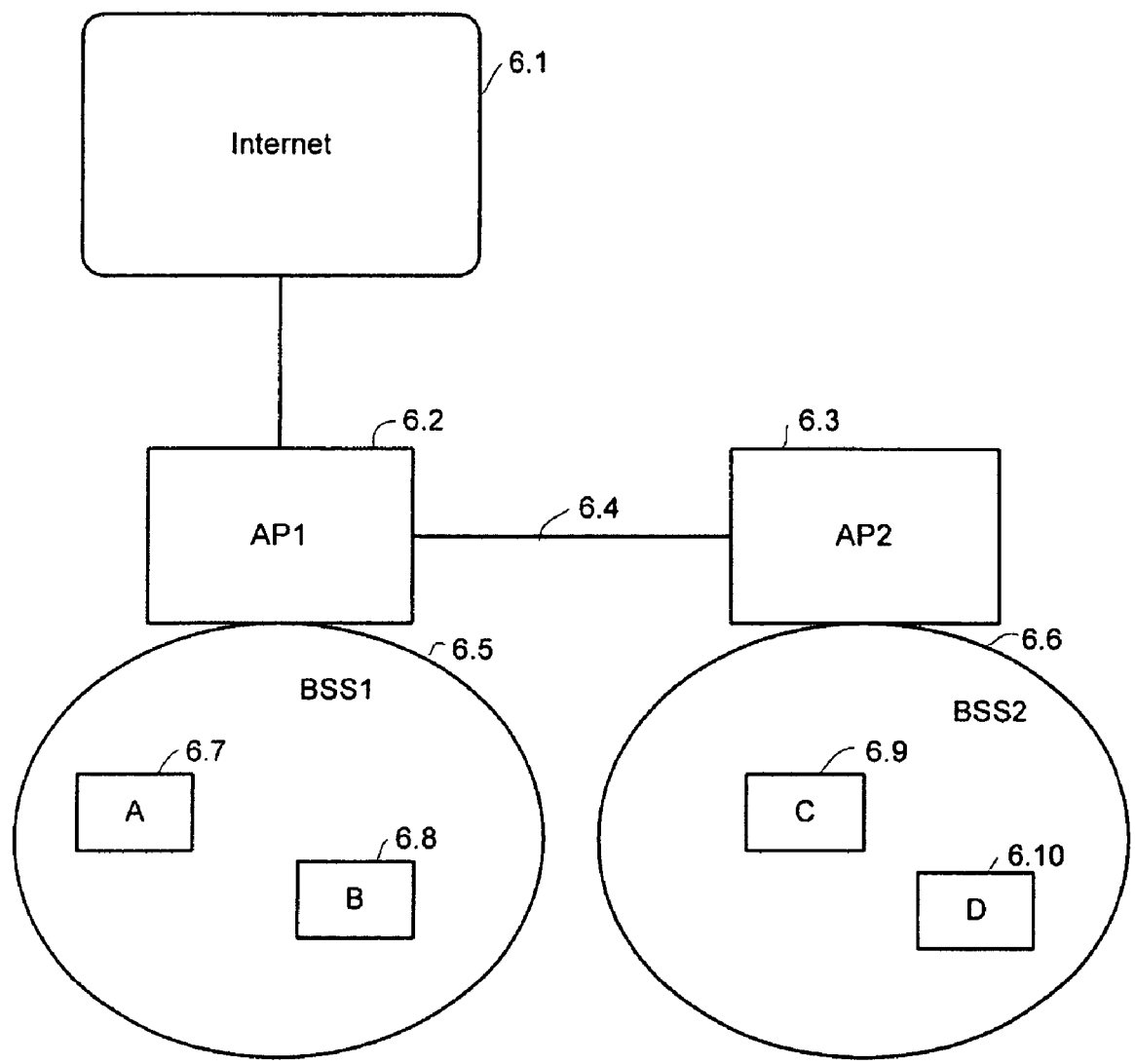

FIG. 6 illustrates a local area network possessing several access points within the framework of the exemplary embodiment of the invention.

Figure 7:
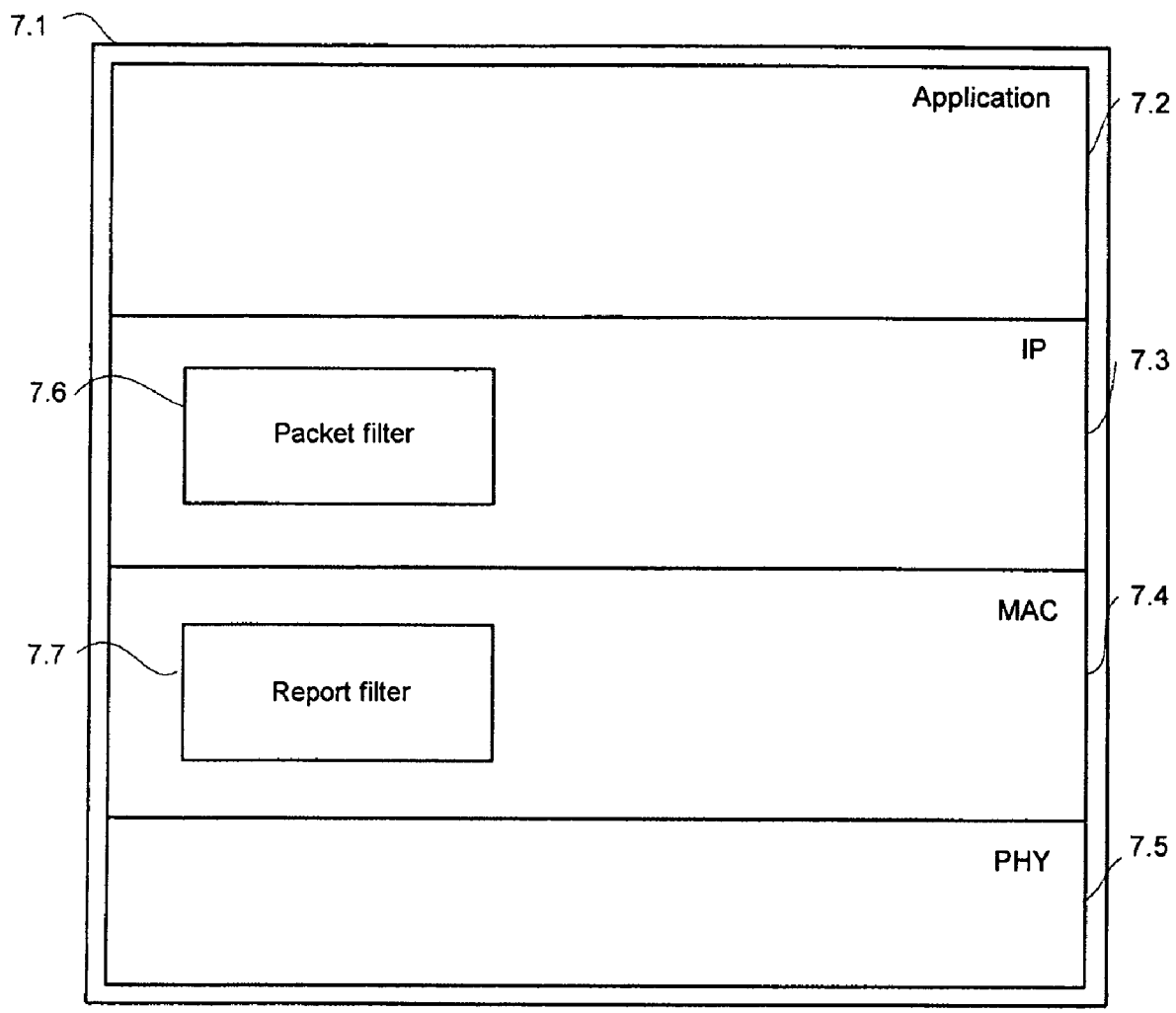

FIG. 7 illustrates the software architecture of the implementation of the exemplary embodiment of the invention.

Figure 8:
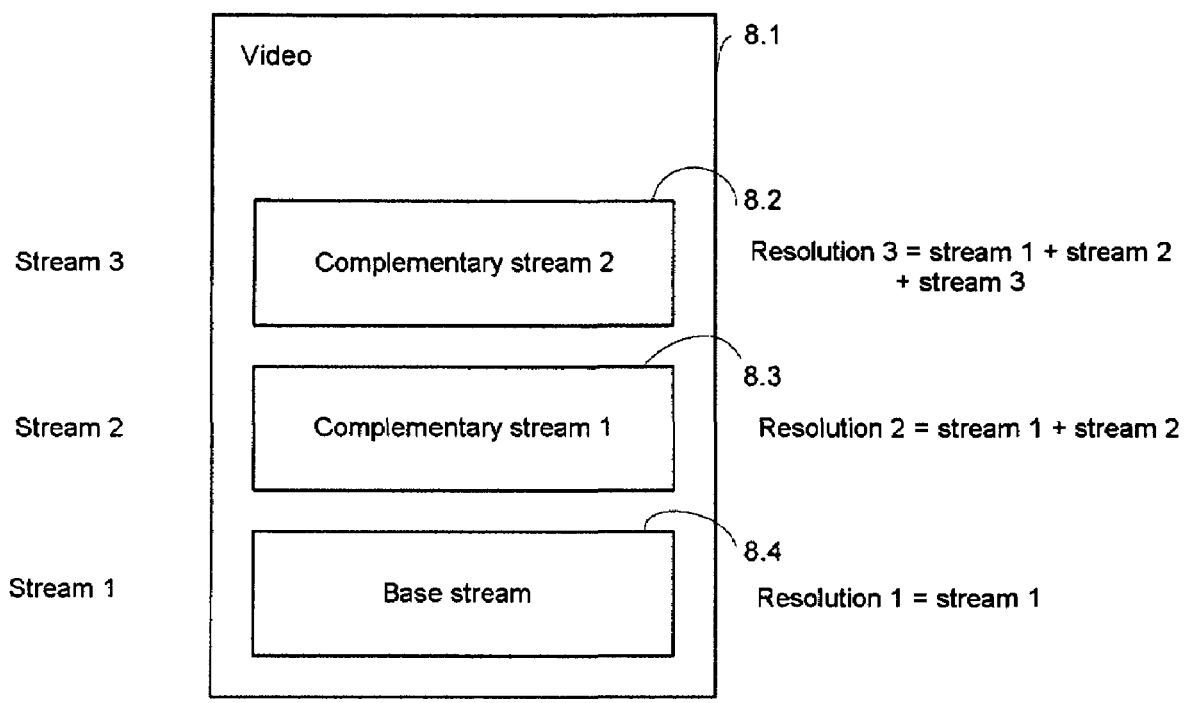

FIG. 8 represents a stream divided into a base stream and two complementary streams.

DETAILED DESCRIPTION OF THE INVENTION

The invention is therefore a method of transforming on the fly a multipoint stream, or of certain components of this stream, arriving at the gateway of a local area network and destined for a client of the local area network into a point-to-point stream. The transformation takes place, for example, on the gateway, in any case in a general manner, on a device through which the IP traffic destined for the devices of the local area network travels. The standpoint of the exemplary embodiment which follows is the case in which the network is a wireless network according to a protocol of the 802.11 family. This example is nonlimiting and the invention may be used with other types of local area networks.

Figure 1A:
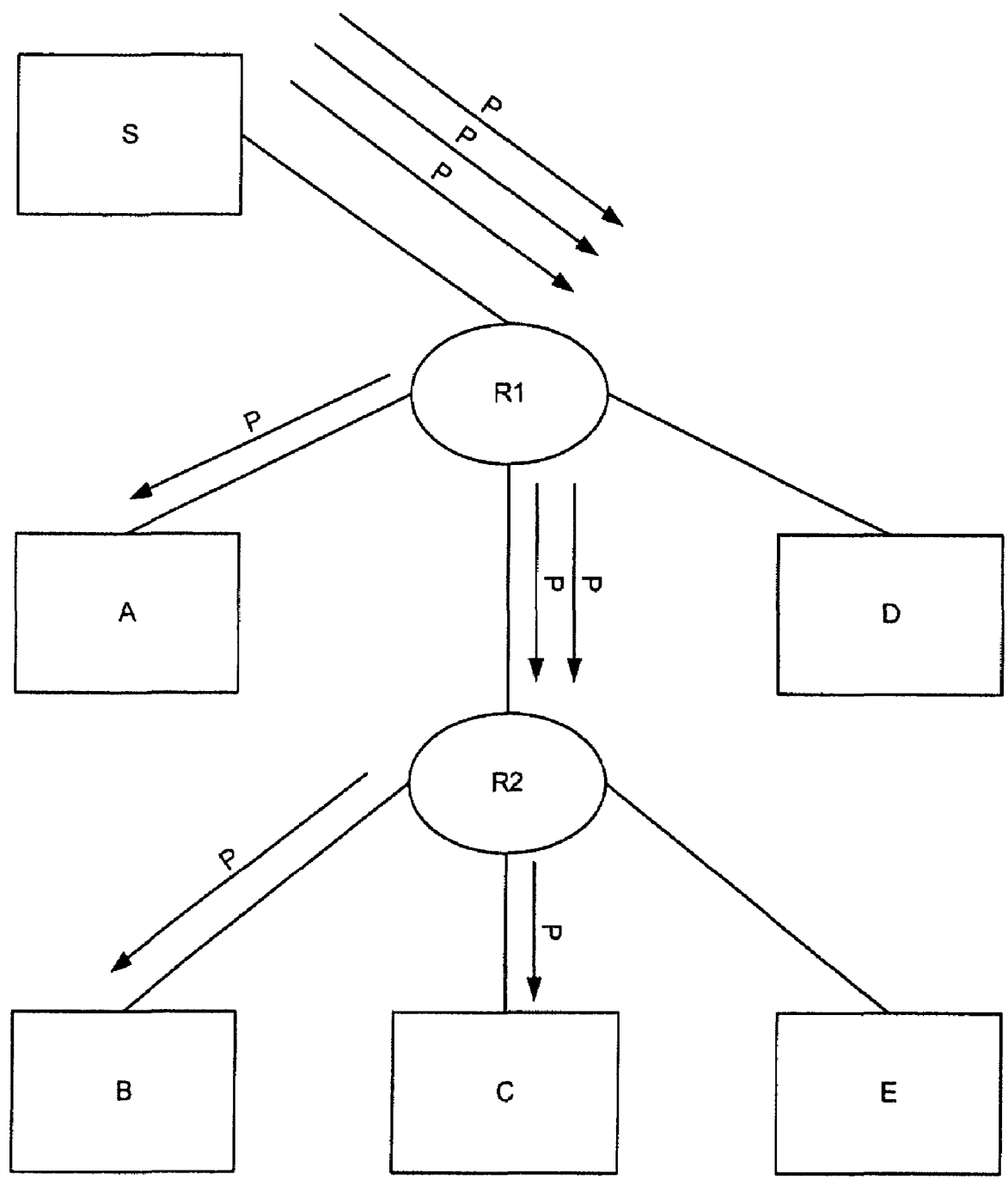
FIG. 1a illustrates the operation of a point-to-point transmission of a packet to three destinations in a known manner.
Figure 1B:
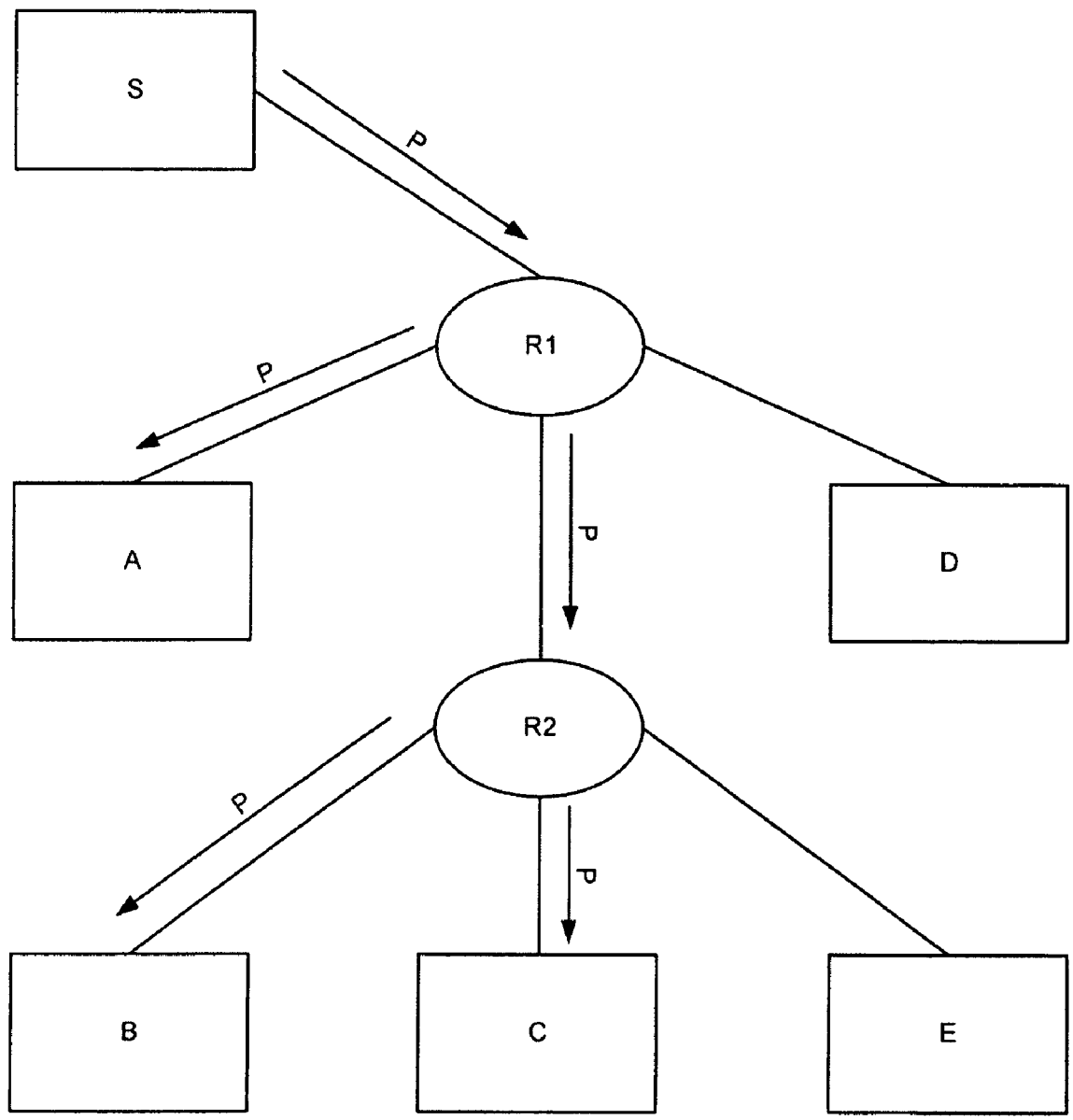
FIG. 1b illustrates the operation of the same distribution in multipoint mode in a known manner.
Figure 2:
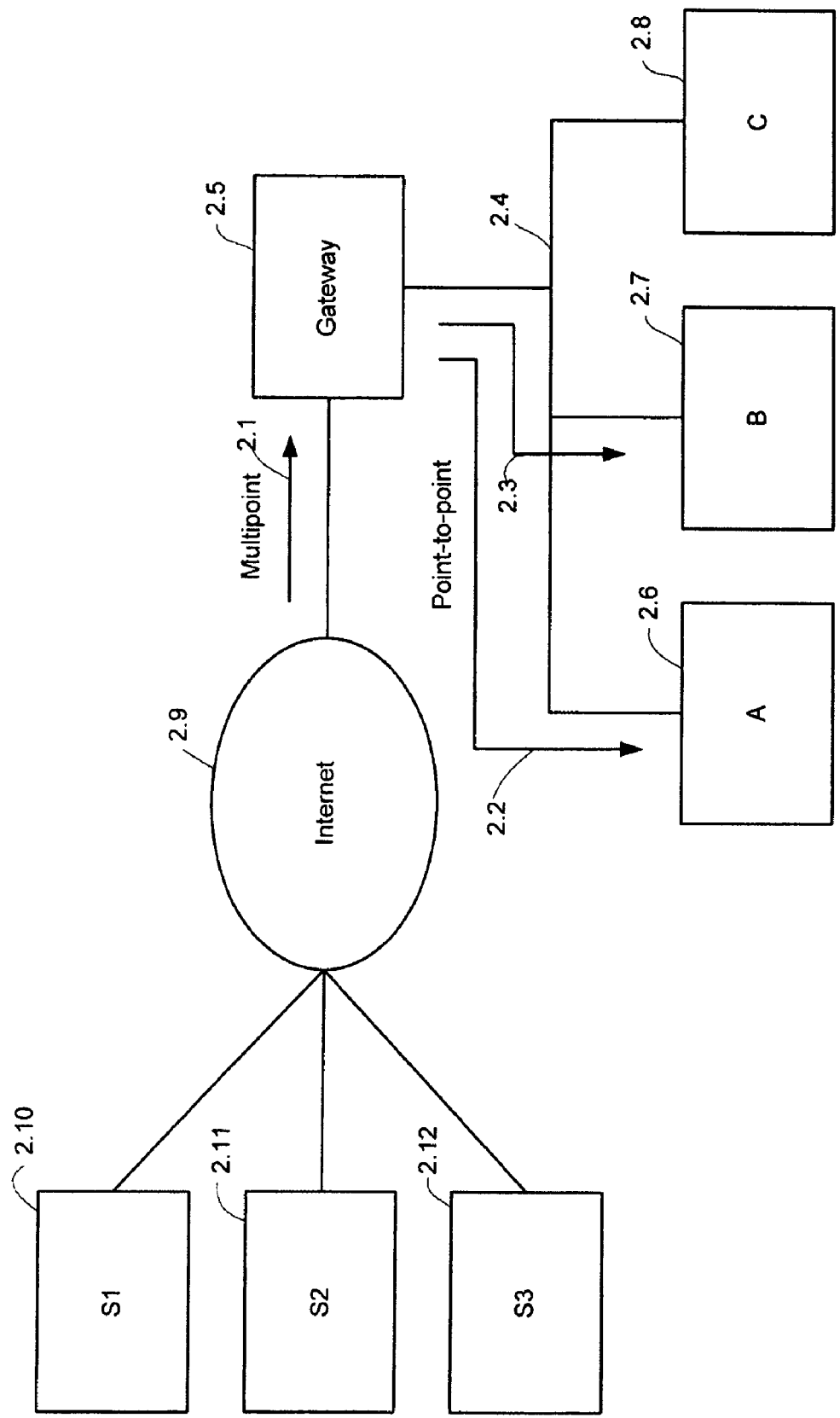
FIG. 2 illustrates a network operation according to an exemplary embodiment of the invention.

FIG. 2 illustrates the network of the exemplary embodiment of the invention. Found firstly therein are sources of data S1, S2 and S3, referenced 2.10, 2.11 and 2.12, which are content servers. These servers are connected to an external network, here the Internet, referenced 2.9. On the user's side will be found a wireless local area network referenced 2.4 linking clients A, B and C, referenced 2.6, 2.7 and 2.8, and an access point serving this gateway, referenced 2.5, linking the local area network to the Internet. The wireless local area network is a network according to a protocol of the 802.11 family but could be based on some other technology. It transpires that the problem of reliability arises in a more acute manner in the case of a wireless network than in the case of a wire network such as an Ethernet network, for example. Clients A, B and C are therefore potential clients for the information transmitted by the servers S1, S2 and S3. These clients will connect up to these transmissions, for example by using the IGMP protocol. The clients will therefore signal their subscription to a transmission in the form of an IGMP report ("IGMP report message"). The gateway when it receives this report will itself send a report of the same type destined for the routers to which it is connected. In this way the information making it possible to route the multipoint stream to the destination will propagate among the routers. These IGMP reports will be intercepted by the access point which will maintain a table associating on the one hand the multipoint transmission address present in the "source address" field of the IGMP report and the MAC ("Medium Access Control") address from which the report originates. The exemplary embodiment of the invention describes a table, but it will be apparent to the person skilled in the art that any other way of managing this association between a multipoint transmission address and the addresses of the clients of the local area network may suit, such as for example a list, a hash table or the like. Analysis of the report proper makes it possible to ascertain whether the client is joining or leaving the transmission group and to modify the table accordingly. Thereafter, a filter implemented in the IP layer of the access point will process the multipoint IP packets on the fly so as to transform them into point-to-point packets at the MAC level. The packets will therefore be intercepted and processed by the filter according to the exemplary embodiment during their transit over the gateway. A multipoint packet, referenced 2.1, will be detected and transformed into two point-to-point packets, referenced 2.2 and 2.3, which will be dispatched to the clients A and B belonging to the transmission group.

A diagram illustrating the principal steps of the processing by the access point of the IGMP report is detailed in FIG. 3. In the case of the exemplary embodiment described, the gateway is the access point of the wireless network to which the clients will connect up, they will be said to associate in the case of a wireless network. The processing is implemented in the form of a filter, referenced 5.12, at the level of the MAC layer which will detect the IP packets corresponding to the IGMP reports originating from the clients connected to the access point. Analysis of these reports makes it possible to extract therefrom the multipoint transmission address and the MAC address of the client from which the report originates. Any IGMP report contains group records indicating either the current status, or the change of status of the interface identified by the MAC address as regards its membership of the multipoint transmission group. This information is coded in the "record type" field of the group record. This information will make it possible to maintain a table, referenced 5.10, on the gateway associating multipoint transmission addresses and a set of MAC addresses corresponding to the interfaces of the clients belonging to this transmission group. In addition to this mechanism making it possible to erase an association in the table upon the dispatching of an IGMP report announcing that a client is leaving a multipoint transmission group, provision may be made to also erase an entry corresponding to a client that is deassociating from the access point. Thus, the client leaving the network therefore leaves the group.

The processing of the packets arriving from the external network at the gateway in multipoint transmission mode, may be undertaken, for example, according to the diagram of FIG. 4. A filter, referenced 5.11, is deployed, for example, at the level of the IP layer of the gateway. This filter will detect all the packets arriving in multipoint mode on the gateway. For each packet of this type arriving, the multipoint transmission address will be extracted. This address will be searched for in the association table referenced 5.10. Were no record corresponding to this address to be found, this indicates that no client of the wireless network belongs to the transmission group, the packet may therefore by forgotten and will not be sent. If a record is found, the multipoint transmission IP packet, or a fragment of the latter, will be encapsulated in at least one MAC packet which will be dispatched to all the MAC addresses indicated in the table. The mode of transmission of this MAC packet will be the point-to-point mode. The MAC packet will therefore be sent as many times as there are destinations. In this way these packets will benefit from the error correction mechanism of this mode of transmission at the MAC level. The reference of the MAC layer in the family of 802 protocols is "IEEE Std 802.11, 1999 Edition (Reaff 2003)". These packets will therefore be received by the MAC layer of the client which will extract the multipoint IP packet therefrom and pass it to the IP layer. It is therefore seen that the method requires no modification of the client. Specifically, the point-to-point mode relates only to the MAC layer. The IP packet sent in the MAC packet remains, for its part, a multipoint IP packet as expected by the IP layer and the application from which the connection originates.

FIG. 5 illustrates the architecture of a gateway operating according to the exemplary embodiment of the invention. The gateway, referenced 5.1, comprises a processor, referenced 5.3, capable of executing programs stored in the read-only memory, referenced 5.2 of the device after having transferred them to the random access memory, referenced 5.4. The device possesses at least two network interfaces. One, referenced 5.5, authorizes the connection of the device to the external network, referenced 5.9, for example the Internet. The other, referenced 5.6, drives wireless transmission means, referenced 5.7, allowing the connection of the clients of the local area network. These elements communicate via the bus, referenced 5.8. The processor, 5.3, makes it possible in particular to execute the network layers including the MAC layer and the IP layer containing the filters, referenced 5.11 and 5.12, according to the exemplary embodiment of the invention. The means of association between the MAC addresses of the clients and the multipoint transmission addresses are represented by an association table in random access memory referenced 5.10.

FIG. 7 details the software architecture of these network layers. The network layers, referenced 7.1 comprise a physical layer, referenced 7.5 tasked with interfacing directly with the communication medium both wireless and the connection to the external network which may be an Ethernet or ADSL connection, for example. Just above the physical layer is found the MAC layer, referenced 7.4, which affords an abstraction of the physical layer actually used. It is at this level that the filter, referenced 7.7, on the IGMP reports is deployed. The IP stack, referenced 7.3, is found above the MAC layer. It is here that the multipoint IP packet filter, referenced 7.6 will be found. The applications, referenced 7.2, use this IP stack to communicate.

An alternative deployment may consist in sending the multipoint packets received and not corresponding to any association in the table in multipoint mode to the clients. In the converse case, the multipoint sending at the MAC level over the local area network may be deactivated.

Certain wireless local area networks may contain several access points. This configuration is illustrated in FIG. 6. Seen there is a first access point AP1 referenced 6.2 connected to an exterior network, here the Internet, referenced 6.1. This first access point covers a first access zone called BSS1 ("Basic Service Set") referenced 6.5. In BSS1 two clients A and B, referenced 6.7 and 6.8, are connected to the access point AP1. A second access point AP2, referenced 6.3, also possesses a zone of coverage BSS2, referenced 6.6. Two clients C and D, referenced 6.9 and 6.10, are connected to this second access point AP2. The two access points are connected together by a network 6.4. This network may be a wire network such as Ethernet, a radio wireless link distinct from the networks constituted by the access points and their clients. A solution in which the second access point AP2 is a client belonging to the zone BSS1 of the first access point may also be contemplated.

The operation of the invention in this framework of a local area network including several access points will depend on the mode of operation of this second access point and on the way in which the routing of the packets will be undertaken in the network. Two cases must be distinguished, in a first case, the access point AP2 will operate as a router at the IP level. In this case, AP2 will appear to the access point AP1 as one of its clients. The subscription to a multipoint transmission of a client of AP2 will give rise to the subscription of AP2 to AP1 for this transmission. The multipoint packets received by AP1 destined for AP2 will therefore be sent to it via a point-to-point transmission at the MAC level. These packets will be received by AP2 at the IP level as normal multipoint packets. It is therefore necessary to deploy the invention also on the access point AP2 so as to send in point-to-point mode to the clients of AP2.

In a second case, the access point AP2 will behave like a bridge over the MAC level, as described in the 802.1d standard. In this case, the network constructed behind AP1 is seen at the IP level as a single network, the distribution of the packets by AP1 to the final clients, its like those situated behind AP2 will be undertaken at the MAC level. In this case, AP1 will transform the multipoint IP packets arriving from the exterior network into point-to-point MAC packets which will be sent directly to the final client, directly or via AP2, without uploading to the IP level. The clients will therefore receive these packets in point-to-point mode whether they are connected to AP1 or to AP2. In this case the invention operates without AP2 having to deploy the invention.

In the case of the deployment of a roaming function, such as described in the 802.11f standard which allows a client connected to an access point to disconnect and reconnect to a new access point without losing his IP connections. The second case then holds in which the second access point deploys a bridge function at the MAC level. The invention will therefore operate in a transparent manner at the level of the second access point.

In this case the invention will be deployed on each access point. A client deassociating from an access point in order to associate to another access point will be disconnected from all his current IP connections. The new access point will naturally take charge of the multipoint traffic destined for the client when the latter recreates his connections after his association to this new access point. In the case of a local area network the access points may deploy roaming functions. In this case, a client who changes access point will be able to retain his IP connections. This occurs by exchange of data between the access points during the migration of the client from one point to another. It is therefore possible to include in the data that the access points exchange during migration the data of the association table relating thereto. In this way the client's new access point can take charge of the processing of the multipoint packets destined for this client.

In the case of a minimal network, where a single client is connected to the gateway, it is possible to devise a simplified deployment where the filter on the IGMP reports in the MAC layer of the gateway will not be required. In this case, the association table becomes unnecessary. Only the filter on the multipoint IP packets that is present in the IP layer of the gateway will be retained while simplifying its manner of operation. The gateway merely sends via the point-to-point mode of the MAC layer the multipoint IP packets received destined for the single client present on the network.

There are multiple ways of separating a digital service transmitted as diverse components. These components being transmitted by means of a client-particular stream.

For example, it is possible to use incremental coders which will code a service, or a component of the latter such as the video, in the form of a first stream of small bandwidth, called the base stream, and of complementary streams. The base stream is generally sufficient to allow the restitution of the service in a degraded mode. As far as the video is concerned, this base service will, for example, contain a low-definition version of the video. The same thing is obviously possible in respect of the audio. Whereas the complementary streams will send the information missing from the base stream making it possible to restore the service in a non-degraded mode.

Such a service, or at least its video component, is represented in FIG. 8. The complete video, referenced 8.1, is therefore decomposed into a first base stream, referenced 8.4, and two complementary streams referenced 8.2 and 8.3. The base stream makes it possible to reconstitute the video in a first low resolution. The decoding of the base stream and of the complementary stream 1 makes it possible to restore a video to an intermediate resolution 2. Whereas the decoding of the three streams makes it possible to restore the complete video in its best resolution, resolution 3.

Another way of incrementally decomposing a video service is to base oneself on the coding of the images. In MPEG-2, for example, the coding involves images, termed I images which are coded intrinsically, that is to say, without calling upon information contained in other images of the stream. The standard also defines images, termed P images, which are coded predictively, that is to say the coding uses the information of the image and of one or more previous P or I images. The standard furthermore defines images termed B images, where the coding uses not only information from the previous images but also from the succeeding I, P images. It is therefore possible to decode only the I images, the I and the P images, the I, P and a few B images or else all the I, P and B images. In this way it is, for example, possible to make a base stream containing the I images, a complementary stream 1 with the P images and a supplementary stream 2 with the B images. In this case, one therefore defines a degraded mode of the service where the number of images received is less without affecting the resolution of the images.

It is therefore apparent that there are multiple ways of dividing a digital service into several streams and that it is possible to define priorities among these streams. Specifically, some of these streams are indispensable to the restitution of the service, without which this restitution is degraded, whereas others will serve merely to improve this restitution. It is therefore possible on the basis of this finding to define a policy for transforming the streams into unicast in which it will be possible to adjust the compromise between quality and bandwidth used. To do this, it is necessary to define those streams that will be sent robustly in point-to-point mode and those streams that will be sent by multipoint transmission.

In this case, the filter applying the transformation of the packets received into multipoint transmission mode will deploy the chosen transmission policy and will transform only some streams into point-to-point mode.

It is therefore necessary for the gateway to store the chosen transmission policy and to be capable of detecting the types of stream it receives so as to be able to deploy this policy. Since the gateway intercepts the exchanges leading to the establishment of the transmission of the packets, for example the exchanges according to the RTSP protocol as well as the exchanges allowing the client to discover the services, for example according to the SDP protocol, the gateway will therefore be capable of determining the type of streams exchanged, base stream or complementary stream. Once the type of the streams has been identified, it will be possible for it to apply the chosen transmission policy.

This transmission policy therefore consists of a set of rules fixing for each type of stream whether the transformation to point-to-point should or should not be put in place. These rules stored by the gateway may be put in place by the user via, for example, a gateway configuration interface. This interface may be an interface deployed via an HTTP access to the gateway, a contemporary solution for configuring devices connected to one network or another. This solution has the advantage that the user will be able to configure his gateway from a client of the network equipped with a conventional HTML client.

It is also possible for this transmission policy to be fixed by the server on a global basis or per session. In this case, the server informs the gateway of the policy, for example, at the time of connection via the SDP protocol.

The priority level of each stream may also be fixed by the service quality interface used by the gateway to connect up to the service. The DiffServ or IntServ protocols defined by the IETF may be used here.

It is also possible to adopt a dynamic transmission policy varying as a function of the transmission conditions. To do this, a system for analysing these conditions, bandwidth, package loss rate, bit error rate, transmission lag or the like may be set in place for example at the level of the clients. This information will be uploaded to the gateway, for example via the RTCP protocol ("Real Time Control Protocol"). The gateway will be able to use this information to modify the transmission policy.

It will be apparent to the person skilled in the art that the invention, although described here within the framework of wireless networks may be adapted to any type of local area network insofar as the latter has available a point-to-point mode immunized against the loss of packets while the multipoint mode is not. Likewise, the person skilled in the art will be able to make modifications to the way in which the association between the transmission addresses and the clients is deployed as well as in the method used in the filters or their location without departing from the scope of the invention.

The invention claimed is:

1. A method of transmitting streams of multipoint packets on a first network received according to a multipoint transmission mode from a second network, said multipoint packets being destined for clients of said first network, said method being implemented by an access point, said multipoint transmission mode referring to a layer above a Medium Access Control (MAC) layer, wherein said method comprises the following steps:

reception of multipoint packets according to said multipoint transmission mode, from said second network;

determining a transmission mode for transmission of said received multipoint packets to clients of said first network from among at least a point-to-point MAC layer transmission mode and a multipoint transmission mode, as a function of a type of stream of said received multipoint packets; and for said received multipoint packets for which said determined transmission mode is point-to-point MAC layer transmission mode, encapsulation of said received multipoint packets in at least one MAC packet and transmission of said at least one MAC packet according to said point-to-point MAC layer transmission mode to at least one of said clients on said first network.

2. The method according to claim 1 further comprising a step of determining a priority level assigned to said multipoint packets as a function of said type of stream of said received multipoint packets, said priority level determining said mode of transmission from among at least a point-to-point MAC layer transmission mode and a multipoint transmission mode of said received multipoint packets as a function of said type of stream of said received multipoint packets.

3. The method according to claim 2, wherein the determination of said mode of transmission as a function of said priority level is performed by applying a transmission policy that is stored.

4. The method according to claim 3 further comprising a step of configuring said transmission policy by a user.

5. The method according to claim 4, wherein the step of configuring by said user is performed from one of said clients.

6. The method according to claim 3 further comprising a step of informing said access point of at least part of said transmission policy by a server from which said multipoint packets are received.

7. The method according to claim 3 further comprising a step of adapting said transmission policy as a function of conditions of transmission on said first network.

8. An access point for connection between a second network and a first network comprising a transmitter for transmitting streams of multipoint packets on said first network received according to a multicast transmission mode from said second network, said multipoint packets are destined for clients of said first network, said multipoint transmission mode referring to a layer above a Medium Access Control (MAC) layer, wherein said access point further comprises:

a receiver for receiving multipoint packets according to said multipoint transmission mode, from said second network;

means of determination of a transmission mode for transmission of said received multipoint packets to clients of said first network from among at least a point-to-point MAC layer transmission mode and a multipoint transmission mode as a function of a type of stream of said received multipoint packets; and for said received multipoint packets for which said determined transmission mode is point-to-point MAC layer transmission mode, an encapsulator for encapsulation of received multipoint packets in at least one MAC packet and a transmitter for transmission of said at least one MAC packet according to said point-to-point MAC layer transmission mode to at least one of said client situated on said first network.

9. The access point according to claim 8, wherein said means of determination comprise means making it possible to allocate a priority level to said received multipoint packets as a function type of stream of said received multipoint packets, said priority level serving for said determination of said transmission mode.

10. The access point according to claim 9 further comprising storage means for storing a transmission policy making it possible to define transmission mode for said received multipoint packets as a function of said priority level.

11. The access point according to claim 10 further comprising means allowing modification of said transmission policy by a user.

12. The access point according to claim 10 further comprising means allowing modification of said transmission policy as a function of information originating from a server from which said multipoint packets are received.

13. The access point according to claim 10 further comprising means allowing a dynamic modification of said transmission policy as a function of conditions of transmission on said first network.

* * * * *

UNITED STATES PATENT AND TRADEMARK OFFICE
CERTIFICATE OF CORRECTION

PATENT NO.      : 7,596,138 B2
APPLICATION NO. : 11/322926
DATED           : September 29, 2009
INVENTOR(S)     : Legallais et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Twenty-eighth Day of September, 2010

David J. Kappos
*Director of the United States Patent and Trademark Office*